UNITED STATES PATENT OFFICE.

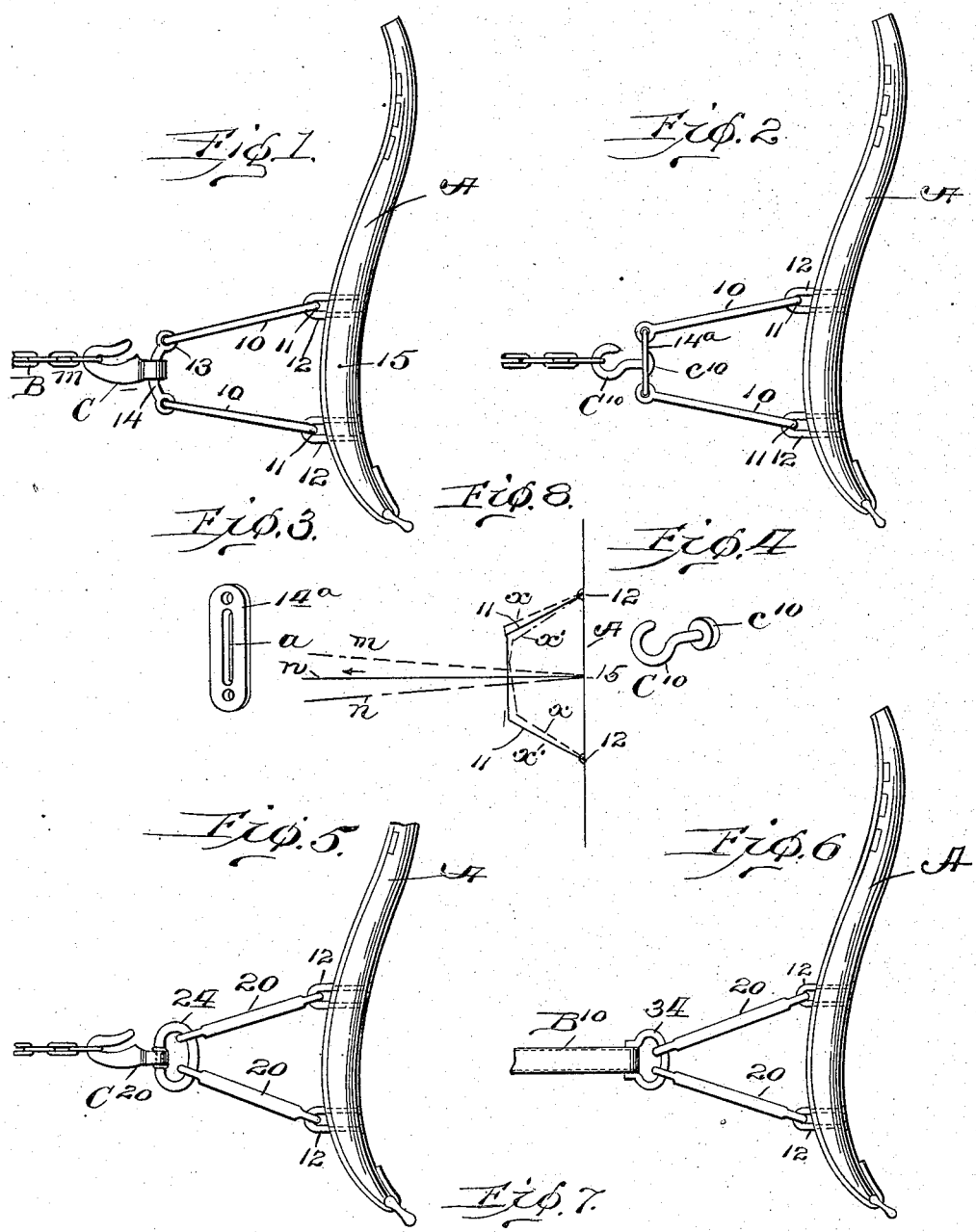

GEORGE L. FORMAN, OF LOUISVILLE, KENTUCKY, ASSIGNOR TO FORMAN-BREEN MANUFACTURING COMPANY, OF LOUISVILLE, KENTUCKY, A CORPORATION OF KENTUCKY.

HAME AND TRACE CONNECTOR.

1,167,161. Specification of Letters Patent. Patented Jan. 4, 1916.

Application filed November 23, 1914. Serial No. 873,510.

*To all whom it may concern:*

Be it known that I, GEORGE L. FORMAN, a citizen of the United States, residing at Louisville, in the county of Jefferson and State of Kentucky, have invented new and useful Improvements in Hame and Trace Connectors, of which the following is a specification.

This application embraces matter which is shown, described and generically claimed in my application for Letters Patent of the United States filed April 1, 1914, Serial No. 828,772, for improvements in hame and trace connectors; particularly relating to that form or forms of the generic invention embodied in my application No. 828,772, in which the elements whose forward ends are loosely or pivotally connected to the hame body are rigid members as contradistinguished from flexible members.

The particular form of the invention made the subject of the present application for patent is susceptible of modification, certain of which modifications are herein exemplified. The features which characterize are set forth in the following description and particularly defined in the subjoined claims.

In the accompanying drawings, wherein like characters of reference denote corresponding parts in the several views: Figure 1 is a side elevation showing a hame-body provided with one form of the present invention; Fig. 2 is a side elevation showing a hame-body provided with a second form of the present invention; Fig. 3 is a detail of one member of the hame-element shown in Fig. 2; Fig. 4 is a detail of the trace element which is used with the construction of hame member shown in Fig. 2; Fig. 5 is a side elevation showing a further modification of the present invention; Fig. 6 is a side elevation of a still further modification of the present invention; Fig. 7 is a detail of a form of rigid member which may be employed in all of the forms of the invention illustrated in the foregoing views; Fig. 8 is a diagrammatic representation illustrative of the operation of the device.

Referring to Fig. 1, A designates a hame-body which may be of the usual or any suitable construction, and B designates a trace. The trace shown in this figure is a chain, but a trace of any other suitable kind may be employed. 10, 10 designate rigid elements of the hame-member of the connector. These elements have their forward ends 11, 11 loosely or pivotally connected to the hame body A by suitable means, as the staples 12, 12, for example. They diverge forwardly from opposite ends of an element, which in this particular form of the invention is a bar 14, and their rear ends 13, 13 are loosely or pivotally connected to opposite ends of said element. The trace member in this particular form of the invention is a hook C having an eye at its end by which it is loosely mounted on the bar 14, the connection between the hook and the bar being such that the hook is free to slide on said bar in the direction of the length of the hame-body. The trace B is connected to this hook. The staples 12, 12—or the elements used in lieu thereof—are arranged on opposite sides of a point, indicated at 15, at which it is desired to maintain the draft and it will be noted that this point is substantially centrally between the places of connection of the elements 10, 10 to the hame.

The action of the device is clearly indicated in Fig. 8, upon reference to which it will be noted that the unbroken lines show the positions of the parts corresponding to those shown in the remaining figures. Suppose the line of stress to be on line $n$ in the direction of the arrow and suppose the line to be shifted to the line $n'$, for example, the rigid elements 10 will revolve about their respective pivot points 12, 12 and the hook C, having free movement on the bar 14, will at the same time slip on the latter until the parts assume the position shown by the dot-and-dash lines $x'$, it being noted that the line of stress will still pass through the point 15. Similarly, if the line of stress be shifted to the line $m$, the parts will assume the position shown by the broken lines $x$, the line of stress continuing to pass through the point 15. Hence, it will be seen that the connection automatically so adjusts itself to the line of draft that the latter will always fall upon a point which is substantially centrally between the places at which the elements 12, 12 are connected to the hame-body. The latter places are so arranged with respect to each other that the strain will be distributed over a comparatively considerable area of the hame-body so that the strain of draft is not localized on a single point on the hame-body. Accordingly, the irritation and galling of the shoulder of the animal is avoided by the present arrangement.

In the construction shown in Fig. 2 the rigid elements, which are designated 10, 10 because they are identical with those shown in Fig. 1, have their rear ends pivoted to a plate 14$^a$ formed with a longitudinal slot $a$ and the hook, marked $C^{10}$ in this figure, has its shank extending through and slidable in the said slot $a$ and is provided at its front end with a head $c^{10}$ which prevents it from being accidentally separated from the plate 14$^a$. In practice, this form of the invention operates substantially like the form shown in Fig. 1.

In both of the forms hereinbefore referred to the hook is arranged to slide in the direction of the length of the hame-body upon an element which connects the rear ends of the members 10 to each other. If desired, however, the element which connects the rear ends of the elements 10 with each other may be arranged to slide relatively to the latter. Such an embodiment of the invention is exemplified in Fig. 5, wherein the trace member includes a hook, marked $C^{20}$ and a part 24 of the style known in the art as a "D", but the part 24 may be of any suitable construction. The part 24 takes the place of the bar 14 and plate 14$^a$, shown respectively in Figs. 1 and 2. Its forward portion is engaged by the forwardly diverging rigid members, marked 20 in this figure, its connection with the rear ends of the latter being such that it is free to slide relatively thereto in the direction of the length of the hame body. The hook, $C^{20}$, is mounted to revolve on the part 24 but moves therewith in the sliding adjustments of the latter, being held against movement longitudinally thereof.

It will be understood that in some instances means other than a hook may be used to connect the trace with the hame member of the connector, it being only necessary that the means be such as to permit free relatively slidable movement of the hame part and trace part of the connection in the direction of the length of the hame body, so that the line of strain will always fall on a point approximately half-way between the places at which the rigid elements are connected to the hame-body. In Fig. 6 I have exemplified an arrangement wherein a leather trace, marked B$^{10}$, is attached directly to the loop or D, the latter being marked 34. In any case it will be noted that as herein exemplified the connector includes parts 10 or 20—called "hame elements"—which are loosely attached to the hame body and a part C, or $C^{10}$, $C^{20}$, or 24 or 34—called a "trace part" which is connected to the trace, and it also will be noted that in all forms the trace part is movable between and relatively to the rear ends of the hame elements in the direction of the length of the hame body and has connection with the rear ends of the hame, either directly as shown in Figs. 5 and 6—in which the D's 24 and 34 are mounted directly in eyes in the rear ends of the elements 20, or indirectly as shown in Figs. 1 and 2—in which the hooks C and $C^{10}$ are mounted on a bar 14 or a plate 14$^a$, respectively, which connect the rear ends of the elements 10 together. The arrangement shown in Figs. 1 and 2 is preferred.

It is to be understood that the normal line of draft, in all cases, and in the diagram, is indicated as horizontal. It will be understood, however, that normally the trace will be inclined downwardly toward the rear. It will also be understood that, depending on the particular shape of the hame body A, the upper and lower hame elements 10 may vary in length relative to each other.

Having now described the invention what I believe to be new and desire to secure by Letters Patent, is:—

1. The combination of a hame-body, and a draft connection arranged constantly to maintain the line of draft through a predetermined point on the hame-body, the said draft connection including rigid elements whose forward ends are loosely connected to the hame-body at spaced points, and a part arranged to be connected to a trace and having connection with the rear ends of said elements and slidable with relation thereto in the direction of the length of the hame-body.

2. The combination with a hame-body and a trace, of means connecting the hame-body with the trace, the said means being arranged to maintain the line of draft through a predetermined point on the hame-body and including rigid elements whose forward ends are loosely connected to the hame-body at spaced points and a part connected to the trace, the said part having lateral pivotal movement and having connection with the rear ends of said elements and being slidable with relation to the latter in the direction of the length of the hame-body.

3. The combination of a hame-body and a draft connection arranged constantly to maintain the line of draft through a predetermined point on the hame-body, the said draft connection including rigid elements whose forward ends are loosely connected to the hame-body at spaced point, an element loosely connected to the rear ends of the first-named elements and connecting the same to each other, and a trace part connected to the second-named element and movable relatively thereto in the direction of the length of the hame-body.

4. The combination of a hame-body and a draft connection arranged constantly to maintain the line of draft through a predetermined point on the hame-body, the said draft connection including rigid elements whose forward ends are loosely connected to the hame-body at spaced points, a bar having its ends loosely connected to the rear ends of said elements and connecting the same, and a part slidably mounted on the said bar.

5. The combination of a hame-body and a draft connection arranged constantly to maintain the line of draft through a predetermined point on the hame-body, the said draft connection including rigid elements whose forward ends are loosely connected to the hame-body at spaced points, an element loosely connected to the rear ends of the first-named elements, and a trace-part connected to the second named element and arranged to move relatively to the latter pivotally in a lateral direction and bodily in the direction of the length of the hame-body.

In testimony whereof I have hereunto set my hand in presence of two subscribing witnesses.

GEORGE L. FORMAN.

Witnesses:
E. M. BREEN,
RAY McGRATH.

Copies of this patent may be obtained for five cents each, by addressing the "Commissioner of Patents, Washington, D. C."